United States Patent
Ogawa

(10) Patent No.: US 7,522,617 B2
(45) Date of Patent: Apr. 21, 2009

(54) INTER-NODE CONNECTION METHOD AND APPARATUS

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 11/341,554

(22) Filed: Jan. 26, 2006

(65) Prior Publication Data

US 2007/0071027 A1    Mar. 29, 2007

(30) Foreign Application Priority Data

Sep. 29, 2005    (JP) ............................. 2005-285141

(51) Int. Cl.
 H04L 12/56    (2006.01)
 H04J 3/22    (2006.01)
 H04J 3/24    (2006.01)
(52) U.S. Cl. ..................... 370/401; 370/466; 370/474; 709/249
(58) Field of Classification Search ......... 370/400–401, 370/464–476; 709/223–229, 238, 245, 249–250
 See application file for complete search history.

(56) References Cited

U.S. PATENT DOCUMENTS

| 7,443,880 | B2 * | 10/2008 | Wetterwald et al. ......... | 370/466 |
|---|---|---|---|---|
| 2004/0100976 | A1 * | 5/2004 | Chang et al. ................. | 370/401 |
| 2006/0067342 | A1 * | 3/2006 | Dispensa ...................... | 370/401 |
| 2006/0193319 | A1 * | 8/2006 | Sung ........................... | 370/389 |

FOREIGN PATENT DOCUMENTS

JP    2003-101590    4/2003

OTHER PUBLICATIONS

Y. Rekhter, et al. Address Allocation for Private Internets. Network Working Group, Feb. 1996 http://www.ietf.org/rfc/rfc1918.txt?number=1918.
P. Srisuresh, et al. Traditional IP Network Address Translator (Traditional NAT). Network Working Group, Jan. 2001 http://www.ietf.org/rfc/rfc3022.txt?number=3022.
J. Rosenberg, et al. STUN-Simple Traversal of User Datagram Protocol (UDP) through Network Address Translators (NATs), Network Working Group, Mar. 2003, http://www.ietf.org/rfc/rfc3489.txt?number=3489.

* cited by examiner

*Primary Examiner*—Tri H Phan
(74) *Attorney, Agent, or Firm*—Katten Muchin Rosenman LLP

(57) ABSTRACT

An inter-node connection method and apparatus for at least a first and second nodes respectively connected to private IP address network ends of at least a first and second address translation devices, which translate a private IP address into a global IP address, through global IP address network ends of the first and second address translation devices. Firstly, a control session is established with the first or the second node respectively through the first or the second address translation device; and secondly a connection request frame or a connection reply frame is respectively transferred to the second or the first node by the control session through the second or the first address translation device when the connection request frame or the connection reply frame is received respectively from the first and second nodes by a data session. The second or the first node transmits a data frame toward the first or the second address translation device, which binds an IP address and a port number of the first or the second node included in the data frame respectively to those of the second or the first address translation device for a direct communication between the nodes.

8 Claims, 18 Drawing Sheets

FIG. 3A

NODE N1 → NAPT DEVICE AC1 → ASSOCIATION SERVER SRV → NAPT DEVICE AC2 → NODE N2

| ITEM NO. | (S1-1) | (S1-2) | (S1-3) | (S1-4) |
|---|---|---|---|---|
| (i) COMMUNICATION DESTINATION LOCAL PORT NO. | 300 | 300 | 300 | 300 |
| (h) COMMUNICATION DESTINATION NODE ID | 0002 | 0002 | 0002 | 0002 |
| (g) COMMUNICATION SOURCE LOCAL PORT NO. | 600 | 600 | 600 | 600 |
| (f) COMMUNICATION SOURCE NODE ID | 0001 | 0001 | 0001 | 0001 |
| (e) PORT NO. OF NAPT DEVICE | — | — | 7800 | 7800 |
| (d) IP ADDRESS OF NAPT DEVICE | — | — | 100.101.102.10 | 100.101.102.10 |
| (c) CONNECTION OK/NG FLAG | — | — | — | — |
| (b) FRAME TYPE (CONNECTION REQUEST or CONNECTION REPLY) | CONNECTION REQUEST | CONNECTION REQUEST | CONNECTION REQUEST | CONNECTION REQUEST |
| (a-4) DESTINATION PORT NO. | 10000 | 10000 | 5200 | 400 |
| (a-3) DESTINATION IP ADDRESS | 200.210.100.5 | 200.210.100.5 | 200.50.40.24 | 192.168.20.2 |
| (a-2) SOURCE PORT NO. | 600 | 7800 | 10001 | 10001 |
| (a-1) SOURCE IP ADDRESS | 192.168.10.1 | 100.101.102.10 | 200.210.100.5 | 200.210.100.5 |

FIG. 3B

NODE N1 ← NAPT DEVICE AC1 ← ASSOCIATION SERVER SRV ← NAPT DEVICE AC2 ← NODE N2

| ITEM NO. | (S4-4) | (S4-3) | (S4-2) | (S4-1) |
|---|---|---|---|---|
| (i) COMMUNICATION DESTINATION LOCAL PORT NO. | 300 | 300 | 300 | 300 |
| (h) COMMUNICATION DESTINATION NODE ID | 0002 | 0002 | 0002 | 0002 |
| (g) COMMUNICATION SOURCE LOCAL PORT NO. | 600 | 600 | 600 | 600 |
| (f) COMMUNICATION SOURCE NODE ID | 0001 | 0001 | 0001 | 0001 |
| (e) PORT NO. OF NAPT DEVICE | 4100 | 4100 | — | — |
| (d) IP ADDRESS OF NAPT DEVICE | 200.50.40.24 | 200.50.40.24 | — | — |
| (c) CONNECTION OK/NG FLAG | OK | OK | OK | OK |
| (b) FRAME TYPE (CONNECTION REQUEST or CONNECTION REPLY) | CONNECTION REPLY | CONNECTION REPLY | CONNECTION REPLY | CONNECTION REPLY |
| (a-4) DESTINATION PORT NO. | 500 | 6900 | 10000 | 10000 |
| (a-3) DESTINATION IP ADDRESS | 192.168.10.1 | 100.101.102.10 | 200.210.100.5 | 200.210.100.5 |
| (a-2) SOURCE PORT NO. | 10001 | 10001 | 4100 | 300 |
| (a-1) SOURCE IP ADDRESS | 200.210.100.5 | 200.210.100.5 | 200.50.40.24 | 192.168.20.2 |

UNDERLINE: UPDATED FIELD

FIG. 5

| | NODE N1 ← NAPT DEVICE AC1 | ← ASSOCIATION SERVER SRV | ← NAPT DEVICE AC2 | ← NODE N2 |
|---|---|---|---|---|
| ITEM NO. | (S9-4) | (S9-3) | (S9-2) | (S9-1) |
| (i) COMMUNICATION DESTINATION LOCAL PORT NO. | 300 | 300 | 300 | 300 |
| (h) COMMUNICATION DESTINATION NODE ID | 0002 | 0002 | 0002 | 0002 |
| (g) COMMUNICATION SOURCE LOCAL PORT NO. | 600 | 600 | 600 | 600 |
| (f) COMMUNICATION SOURCE NODE ID | 0001 | 0001 | 0001 | 0001 |
| (e) PORT NO. OF NAPT DEVICE | — | — | — | — |
| (d) IP ADDRESS OF NAPT DEVICE | — | — | — | — |
| (c) CONNECTION OK/NG FLAG | NG | NG | NG | NG |
| (b) FRAME TYPE (CONNECTION REQUEST or CONNECTION REPLY) | CONNECTION REPLY | CONNECTION REPLY | CONNECTION REPLY | CONNECTION REPLY |
| (a-4) DESTINATION PORT NO. | 500 | 6900 | 10001 | 10001 |
| (a-3) DESTINATION IP ADDRESS | 192.168.10.1 | 100.101.102.10 | 200.210.100.5 | 200.210.100.5 |
| (a-2) SOURCE PORT NO. | 10001 | 10001 | 5200 | 400 |
| (a-1) SOURCE IP ADDRESS | 200.210.100.5 | 200.210.100.5 | 200.50.40.24 | 192.168.20.2 |

UNDERLINE: UPDATED FIELD

INTER-NODE CONNECTION METHOD AND APPARATUS

BACKGROUND OF THE INVENTION

1. Field of the Invention

The present invention relates to an inter-node connection method and apparatus, and in particular to a method and apparatus for mutually connecting nodes (terminals) through address spaces managed with different allocation policies, that is a private IP address network and a global IP network.

2. Description of the Related Art (1) Kinds of IP Address and Translation (Conversion) Method Thereof An IP address is defined as comprising two kinds, i.e. a global IP address and a private IP address based on an allocation (assignment) policy as noted below (see e.g. non-patent document 1):

Global IP address: IP address uniquely allocated for a device connected to the Internet;

Private IP address: IP address uniquely allocated for a device connected to a network within an organization such as an intranet. While it is possible to freely make an address allocation within an organization even without applications, address uniqueness is not guaranteed over the Internet, so that communications cannot be made over the Internet as it is.

(2) Address Translation

In order for a node having a private IP address to communicate with a node having a global IP address, an address translation is required between both of the addresses. A device having a NAPT (Network Address Port Translation: IP masquerade) (hereinafter, referred to as "NAPT device") as a representative technique comes into widespread use (see e.g. non-patent document 2).

NAPT device: In a case as shown FIG. 16 where a plurality of nodes each having a private IP address, namely, a local (private) node (hereinafter, simply referred to as a node) N1 of a private IP address "192.168.0.10", and a local node N2 of a private IP address "192.168.0.20" reside in a private IP address network NW1, and also a global node N3 of a global IP address "202.232.2.13" resides within a global IP address network NW2, the node N3 cannot determine only with a single global IP address from which node of a private IP address it has received a packet (frame). Therefore, the provision of a NAPT device AC including therein a bind table BT can associate the IP addresses with the port numbers and so relate the packet to a local node.

For example, the NAPT device AC having first received a packet from the node N1 having the private IP address "192.168.0.10" prepares an entry of the bind table BT by allocating thereto a port (IP address "202.19.176.120": port number "10080") at the end (on the side) of its own global IP address network NW2. Namely, this bind table BT has an entry prepared with a frame transmitted by the node N1 in which a port at the end of the global IP address network NW2 of the NAPT device AC is allocated, so that the NAPT device AC enables only an address translation from the local nodes N1 and N2 toward the global node N3.

Accordingly, in a case as shown in FIG. 17 where the nodes N1 and N2 are set up in the private IP address spaces NW1 and NW3 which are mutually different and are mutually connected with NAPT devices NC1 and NC2 as well as a global IP address network NW2 connecting both devices, no frame can reach into the private IP address networks from the global IP address network, disabling communications between the nodes N1 and N2 (at step T0).

(3) STUN

As a measure for solving such as a problem of a NAPT device as indicated above (2), a STUN (RFC 3489) system is mentioned (see e.g. non-patent document 3).

This STUN system solves such a problem by providing, as shown in FIG. 18, an association server (hereinafter, occasionally simply referred to as a server) SRV which manages the following entries (information) in the form of a table TBL at the end of the global IP address network NW2, where both transmitting/receiving nodes behave as if they are positioned at the transmitting end since both transmit a frame in advance of the reception. It is to be noted that STUN is applied to UDP, not to TCP.

[Entries of Table TBL Managed by Association Server SRV]

Global IP address (WAN IP address) and global port (WAN port) number of the NAPT devices AC1 and AC2;

Identification number of node (IDs uniquely allocated to all nodes);

Local port (LAN port) number of node.

Namely, from the nodes N1 and N2, a LAN port allowing the association server SRV to connect to the outside is preliminarily registered, while the association server SRV allocates unique IDs (hereinafter, occasionally referred to as node ID) to the nodes N1 and N2, whereby the association server SRV prepares entries of the management table TBL.

In the following, a procedure of an inter-node connection (communication) will be described referring to FIG. 18, where it is to be noted that this figure shows an example of a connection from a port 700 of the node N1 to a port 300 of the node N2 and that occasionally ports and port numbers are mutually denoted with identical reference numerals:

Step S11:

The source node N1 transmits to the association server SRV a "connection request" frame composed of a node ID "0002" and a local port number "300" of the communication destination node N2 with which the source node Ni desires to communicate.

Step S12:

The association server SRV notifies to the communication source node N1 and the communication destination node N2 respectively an IP address and a port number at the end of the global IP address network NW2 of opposed NAPT devices AC2 and AC1. Namely, the association server SRV notifies a global IP address and a port number "100.101.102.10:8700" of the NAPT device AC1 to the node N2, and notifies a global IP address and a port number "200.50.40.24:4100" of the NAPT device AC2 to the node N1.

Step S13:

The node N1 transmits a frame to the global IP address and the port number (200.50.40.24:4100) of the NAPT device AC2 which forms a Peer notified at the above step S12, whereby the NAPT device AC1 binds (associates) the private IP address and the port number of the node N1 with the global IP address and the port number of the NAPT device AC2, respectively.

Step S14:

The node N2 transmits a frame to the global IP address and the port number (100.101.102.10:8700) of the NAPT device AC1 which forms a Peer notified at the above step S12, whereby the NAPT device AC2 binds (associates) the private IP address and the port number of the node N2 with the global IP address and the port number of the NAPT device AC1, respectively.

Step S15:

The nodes N1 and N2 establish a direct session (path) through the NAPT devices AC1-AC2, not through the association server SRV.

Step S16:

Namely, notifications of the global IP address and the port number of the NAPT devices to the communication source node and the communication destination node respectively as indicated at the above step S12 enable accesses to be commenced from the nodes N1 and N2 at the ends of the private IP address networks NW1 and NW3 respectively at the above steps S13 and S14.

Step S17:

On the other hand, as prior art which improves a transfer efficiency by a mutually direct communication between servers, there have been proposed equipment, mechanism, method, and medium recording them, for dynamically exchanging bidirectional data among devices having private address and devices having global address going over network routers, in which the P-side device and the G-side device are connected to a session management server (S) installed in the G-side, and the S supervises data area which is allocated uniquely; data are transferred directly between devices not passing through the S, according to the obtained session information, such as data transfer request, regarding own device; direct data transfer from the G-side to the P-side becomes possible by replacing it to direct data acquisition from the P-side to the G-side; this being applied to the communication between P-side devices separated by the G-side network (see e.g. patent document 1).

[Non-patent Document 1]
http://www.ietf.org/rfc/rfc1918.txt?number=1918

[Non-patent Document 2]
http://www.ietf.org/rfc/rfc3022.txt?number=3022

[Non-patent Document 3]
http://www.ietf.org/rfc/rfc3489.txt?number=3489

[Patent Document 1] Japanese patent application laid-open No. 2003-101590

An association server of the above mentioned STUN system makes an access to a node with a management table having entries (registrations) of a port number which each node opens to the public. In the example of FIG. 18, the table TBL of the association server SRV has five ports' entries.

Therefore, the increase of port number for entry will increase the cost of the resource (memory, hard disk, CPU etc.) of the association server, resulting in a limited scalability.

SUMMARY OF THE INVENTION

It is accordingly an object of the present invention to provide an inter-node connection method and apparatus wherein the number of entries the association server holds is restricted to the bare minimum, that is the number of items in the management table TBL shown in FIG. 18 is reduced, although providing an equivalent function.

In view of the above object, the inventor of this patent application has noticed a separation between a control session and a data transfer session as follows:

(1) Both sessions are employed to dynamically exchange, between nodes, entries having been held in the management table of the STUN association server;

(2) The association server only manages the information of the control session.

On the basis of this point, the present invention provides an inter-node connection method (apparatus) for at least a first and second nodes respectively connected to private IP address network ends of at least a first and second address translation devices, which translate a private IP address into a global IP address, through global IP address network ends of the first and second address translation devices, comprising: a first step of (means) establishing a control session with the first or the second node respectively through the first or the second address translation device; and a second step of (means) transferring a connection request frame or a connection reply frame respectively to the second or the first node by the control session through the second or the first address translation device when the connection request frame or the connection reply frame is received respectively from the first and second nodes by a data session.

It is to be noted that this inter-node connection apparatus corresponds to an association server as described below.

In the above inter-node connection method (apparatus), a data frame may be transmitted toward the first or the second address translation device based on an IP address and a port number of the first or the second address translation device respectively included in the connection request frame or the connection reply frame after the second or the first node has respectively received the connection request frame or the connection reply frame; and the first or the second address translation device is enabled to bind an IP address and a port number of the first or the second node included in the data frame respectively to the IP address and the port number of the second or the first address translation device for a direct communication between the nodes.

When having received the connection request frame and recognized that a port of the second node associated with the connection request frame is unavailable, the second node may transmit the connection reply frame of the recognition to the first node from a port of the control session.

The control session may be established based on an identification number of each node, a global IP address and a port number of each address translation device, and a port number of each node.

It is to be noted that the above address translation device is, for example, a NAPT device An inter-node connection method and apparatus according to the invention as above noted will be described referring to the drawings. It is to be noted that the drawings and the description thereof are merely exemplified to assist the understanding of the present invention and do not restrict the present invention itself.

Operation Principle [1]

FIG. 1 showing an operation principle [1] of the present invention provides an arrangement similar to the STUN shown in FIG. 18. In this example shown, an access from the port 600 of the node N1 to the port 300 of the node N2 will be described, where following matters are presumed:

(1) It is supposed that control sessions CS1 and CS2 are preliminarily established as indicated in the management table TBL and that the nodes N1 and N2 can make use of any port for the control sessions CS1 and CS2. It is also supposed in the example of FIG. 1 that the control sessions CS1 and CS2 are established at the following ports:

Node N1: port 500

Node N2: port 400

(2) It is also supposed that the node N1 preliminarily knows a global IP address "200.210.100.5" and a port number "10000" of the association server SRV to be accessed, and a node ID "0002" and a port number "300" of the node N2 with a certain technique not described here.

A format of a control frame exchanged between the nodes N1-N2 is shown in FIG. 2. The contents of each field of this frame are as follows:

(a) UDP/IP header: Existing so-called TCP/IP header;

(b) Frame type (connection request/connection reply): Field indicating whether the frame is a "connection request" or "connection reply";

(c) Connection OK/NG flag: Flag indicating whether a communication destination node permits or rejects communications with a communication source node;

(d) IP address of NAPT device: Global IP address of the NAPT device;

(e) Port number of NAPT device: Port number (WAN port number) of the NAPT device;

(f) Communication source node ID: Node ID of the communication source node which has generated a connection request;

(g) Communication source LAN (local) port number: Port number which the communication source node having generated the connection request utilizes at the time of communications with the communication destination node;

(h) Communication destination node ID: Communication destination node ID of the connection request;

(i) Communication destination LAN port number: Port number requested by the communication source node for the connection to the communication destination node.

The operation procedure shown in FIG. 1 will be described along a status transition example of a frame shown in FIG. 3. It is to be noted that in the figures, a "communication source" denotes the initial starting point of a frame, a "source" an immediate starting point of a frame, a "communication destination" a final arrival point of a frame, and a "destination" an immediate arrival point of a frame.

Steps S1_1, S1_2:

The node N1 transmits a frame of "connection request" (frame type of FIG. 3A(b)) (hereinafter, simply occasionally referred to as connection request) toward the node N2 to the association server SRV from the port number "600" of the data session DS1 (FIG. 3A(g)) communicating with the node N2 of the port number "300" (FIG. 3A(i)). It is to be noted that the connection request frame is not transmitted by the control session CS1. Since preliminarily knowing the global IP address and the port number of the association server SRV (FIG. 3A(a-3):(a-4)), the node N1 is to automatically allocate the port number "7800" of the NAPT device AC1 corresponding thereto.

Steps S1_3, S1_4:

The association server SRV assigns the global IP address and the port number (100.101.102.10:7800) at the end (on the side) of the global IP address network NW2 of the NATP device AC1 to the "connection request" frame from the node N1. At this time, only the control session CS2 based on the management table TBL is set for the node N2, so that the frame is transferred to the port number "400" (FIG. 3A(a-4)) of the node N2 through the control session CS2.

On this occasion, the association server SRV acquires the IP address and the port number (100.101.102.10:7800) at the end of the global IP address network NW2 of the NAPT device AC1 from the fields of the source IP address and the port number (FIG. 3A(a-1):(a-2)) in the "connection request" frame received from the NAPT device AC1.

Steps S2, S3, S4_1, S4_2:

Upon receiving the "connection request" frame at the above steps S1_3 and S1_4, the node N2 determines whether or not the communication destination port "300" of the connection request is available. If it is available, the node N2 transmits a "connection reply" frame where "connection OK/NG flag =OK" (FIG. 3B(c)) is set to the association server SRV through the data session DS2 from the communication destination port "300" (FIG. 3B(a-2)) of the "connection request" frame. A case where it is unavailable will be later described in an operation principle [2] of the present invention.

Steps S4_3, S4_4:

Upon receiving the "connection reply" frame at the above step S3, the association server SRV identifies that the communication source node ID value "0001" (FIG. 3B(f))=node N1, thereby specifying the control session CS1 toward the communication destination node N1. In the case where the connection OK/NG flag=OK, the "connection reply" frame at the above step S3 is assigned with the IP address and the port number (200.50.40.24:4100) at the end of the global IP address network NW2 of the NAPT device AC2, and is transferred to the node N1 by the control session CS1.

On this occasion, the association server SRV acquires the IP address and the port number (200.50.40.24:4100) at the end of the global IP address network NW2 of the NAPT device AC2 from the fields of the source IP address and the port number (FIG. 3B(a-2):(a-1)) of the "connection reply" frame received from the NAPT device AC2.

Step S5:

The node N1 receives the "connection reply" frame transferred at the above steps S4_3 and S4_4 to identify the "connection OK/NG flag" in the connection reply frame. As a result, in the case where the connection OK/NG flag=OK, the node N1 extracts the IP address and the port number (200.50.40.24:4100) at the end of the global IP address network NW2 of the NAPT device AC2 from the connection reply frame, and transmits a UDP data frame through the data session DS1 toward that address. Consequently, the NAPT device AC1 binds (associates) the IP address and the port number (192.168.10.1:600) of the node N1 with the IP address and the port number (200.50.40.24:4100) at the end of the global IP address network NW2 of the NAPT device AC2. A case where the connection OK/NG flag=NG will be later described referring to the operation principle [2] of the present invention.

Step S6:

The node N2 extracts the IP address and the port number (100.101.102.10:7800) at the end of the global IP address network NW2 of the NAPT device AC1 from the "connection reply" frame received at the processing of the above step S3, and transmits a UDP data frame through the data session DS2 toward that address. Consequently, the NAPT device AC2 binds (associates) the IP address and the port number (192.168.20.2:300) of the node N2 with the IP address and the port number at the end of the global IP address network NW2 of the NAPT device AC1.

Step S7:

Between the nodes N1-N2, a direct communication is commenced not through the association server SRV.

Thus, communications between the nodes N1-N2 at the end of the private IP networks NW1 and NW3 can be commenced respectively at the above steps S5 and S6.

Operation Principle [2]

FIG. 4 shows an operation principle [2] of the present invention the arrangement of which is similar to that shown in FIGS. 18 and 1, in which this example shows a case where the communication destination port "300" of the "connection request" at the node N2 is unavailable. It is to be noted that this case is similarly applied to the above premise matters (1) and (2). Also, the above steps S1_1-S1_4, and step S2 extending from the node N1 through the data session DS1 and the control session CS2 to the node N2, as well as the status transition of a frame shown in FIG. 3A are similarly applied to this operation principle [2]. Therefore, a status transition example of a frame is different from the operation principle [1] only in a case where a frame is forwarded from the node N2 to the node N1, as shown in FIG. 5.

Steps S8, S9_1, S9_2:

If the communication destination port "300" of the "connection request" frame from the node N1 is unavailable, the node N2 returns the "connection reply" frame having "connection OK/NG flag=NG" (FIG. 5(c)) to the association server SRV from the port "400" (FIG. 5(a-2)) of the control session CS2.

Steps S9_3, S9_4:

Upon receiving the above "connection reply" frame, the association server SRV identifies that the communication source node ID value "0001" (FIG. 5(f))=node N1, specifies the control session CS1 toward the communication destination node N1, and transfers the "connection reply" frame to the node N1 through the control session CS1.

The node N1 receives the "connection reply" frame transferred from the association server SRV, thereby identifying the "connection OK/NG flag" of the "connection reply" frame. If the connection OK/NG flag=NG, then the node N1 notifies to a console or the like that the communication request is rejected.

As described above, while in the prior art the association server holds entries of a port number for every node, in the present invention only entries of a control session for every node have to be prepared, whereby necessary resources for the association server are advantageously suppressed.

Also, without any functional addition to the address translation device, an IP address and a port number can be notified to communication nodes, so that the cost of the address translation device can be suppressed.

Furthermore, connection requests to a port not opened to the public or closed by a communication destination node can be rejected, so that communications can be flexibly applied to ports.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 3A and 3B are charts each showing a status transition example of a frame where connection OK/NG flag=OK in the operation principle [1] of the present invention;

FIG. 5 is a chart showing a status transition example of a frame where connection OK/NG flag=NG and a connection reply frame is transferred in the operation principle [2] of the present invention;

DESCRIPTION OF THE EMBODIMENTS

◎ Embodiment of Node

Figure 1:
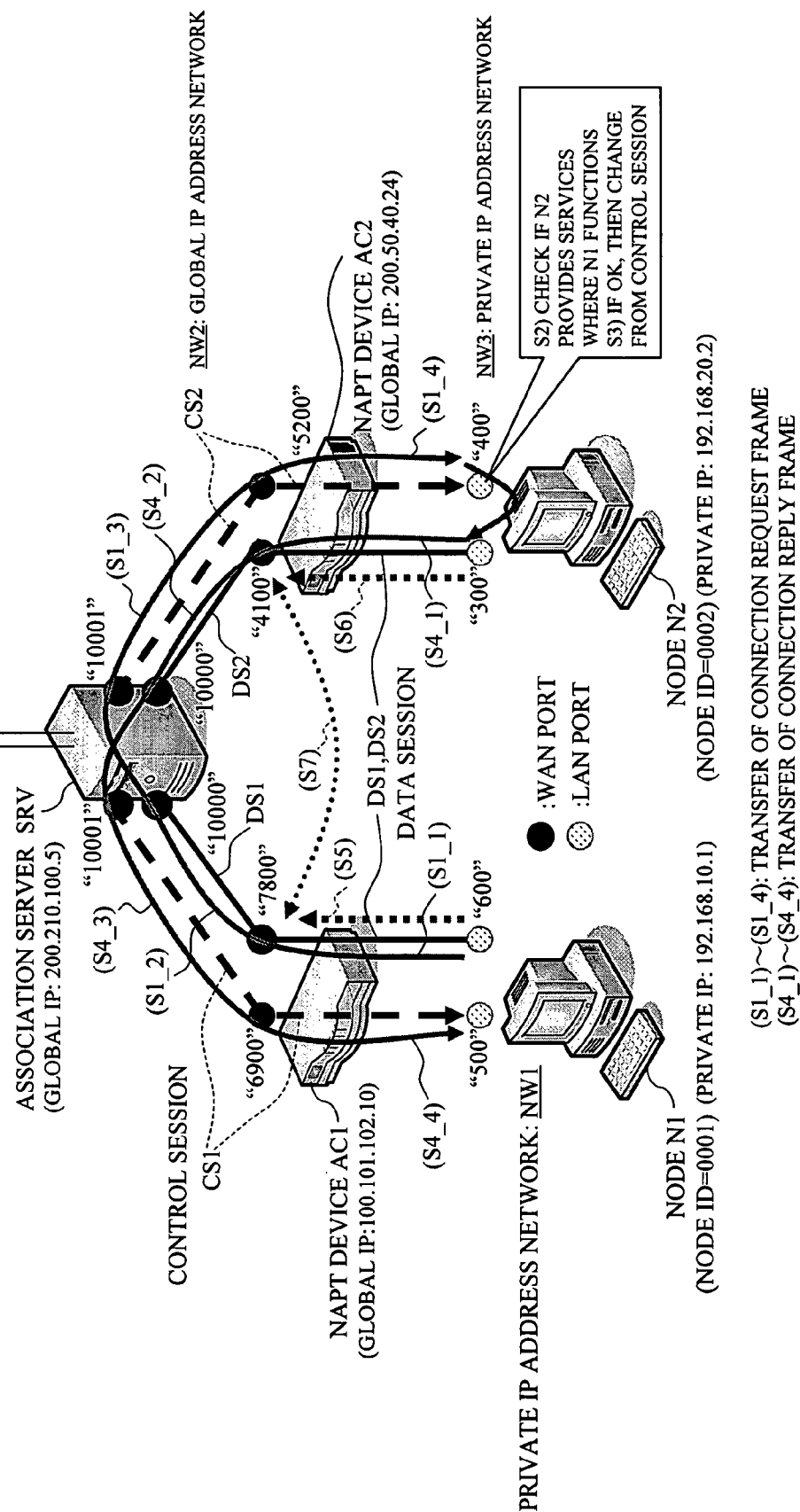
FIG. 1 is a block diagram showing an operation principle [1] of an inter-node connection method and apparatus according to the present invention.
Figure 2:
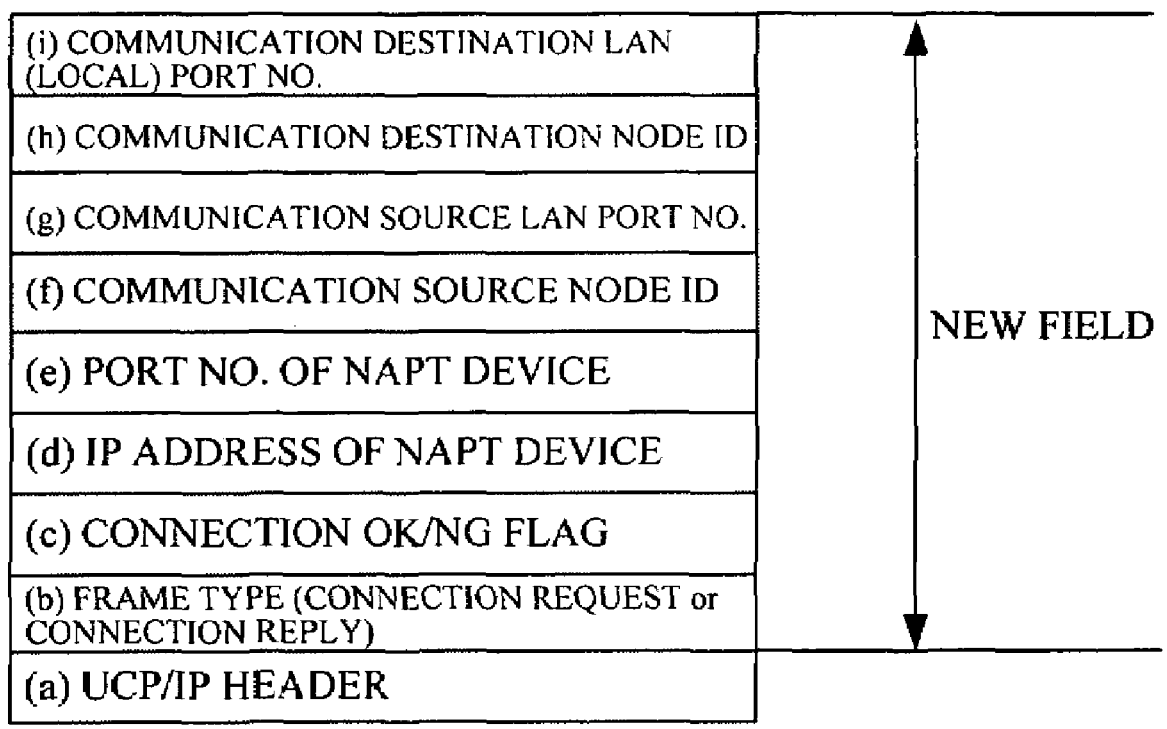
FIG. 2 is a diagram showing a frame format example used in the present invention.
Figure 4:
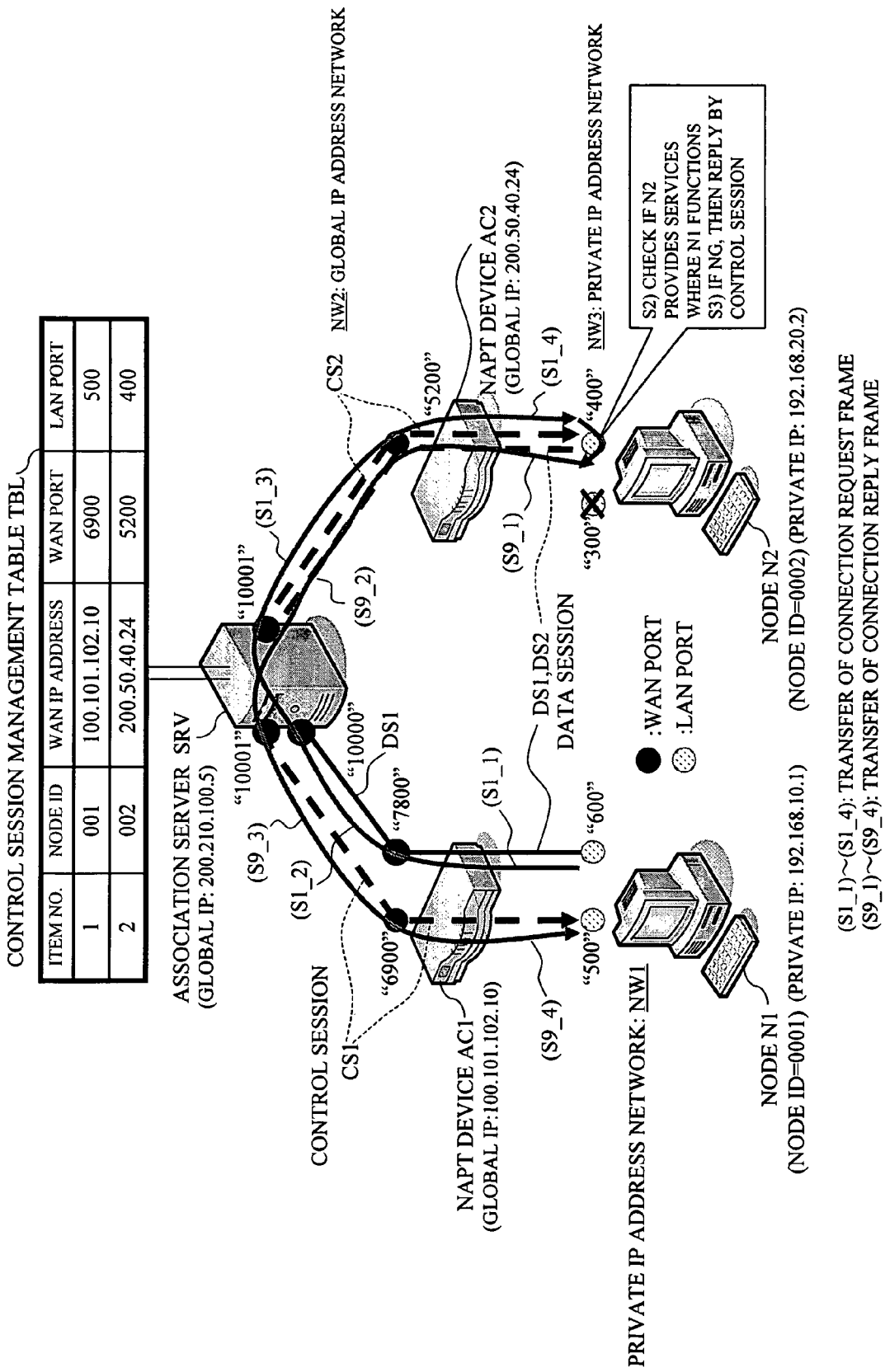
FIG. 4 is a block diagram showing an operation principle [2] of an inter-node connection method and apparatus according to the present invention.
Figure 6:
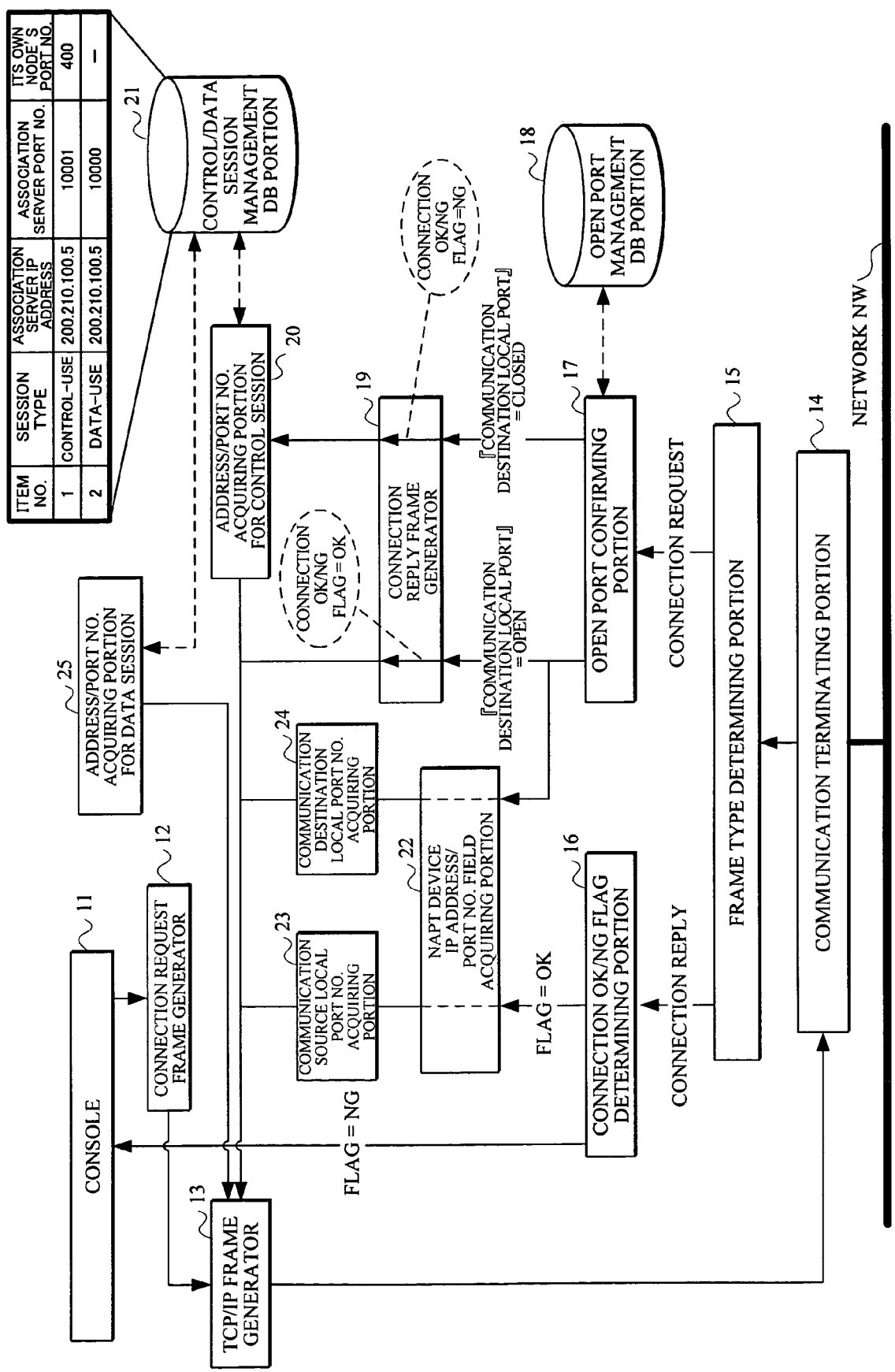
FIG. 6 is a block diagram showing an arrangement example of each node used in the present invention shown in FIGS. 1 and 4.

FIG. 6 shows an arrangement embodiment of the nodes (terminals) N1 and N2 shown in FIGS. 1 and 4. Hereinafter, the function of each block will be sequentially described.

Console 11

This is an interface portion with a user, and makes the following instructions or notifications:

(1) Preparation instructions of "connection request";
(2) Notifications in a case where the "connection OK/NG flag" of a "connection reply" frame is NG, namely indicating that a connection request is rejected by a communication destination node.

Connection Request Frame Generator 12

This generates a connection request frame according to instructions from the console 11.

TCP/IP Frame Generator 13

This generates a so-called TCP/IP frame.

Communication Terminating Portion 14

This terminates communications from the network NW (NW1, NW3) up to the link layer, and transfers a frame received from the network NW to a frame type determining portion 15. This portion also performs a processing for link layer with respect to a frame transferred from the TCP/IP frame generator 13 to be transmitted to the network NW.

Frame Type Determining Portion 15

This identifies a frame type field of a frame provided from the communication terminal portion 14, and transfers the frame to a connection OK/NG flag determining portion 16 if it indicates "connection reply", and to an open port confirming portion 17 if it indicates "connection request".

Connection OK/NG Flag Determining Portion 16

This identifies a connection OK/NG flag field of the "connection reply" frame provided from the frame type determining portion 15, transfers the frame to a NAPT device IP address/port No. field acquiring portion 22 in case of "OK", and notifies to the console 11 in case of "NG" that the communication is rejected by a connection request destination.

Open Port Confirming Portion 17

This acquires "communication destination LAN port No. field" from the "connection request" frame provided from the frame type determining portion 15 to inquire whether or not the port number is opened of an open port management DB portion 18 as described below, where that a port is open means that the port can transmit/receive the frame:

(1) A case where the port number is opened to the public: This portion 17 instructs a connection reply frame generator 19 to generate a connection reply frame of "connection OK/NG flag=OK", and then transmits the "connection request" frame to the NAPT device IP address/port No. field acquiring portion 22.

(2) A case where the port number is not opened to the public, that is closed: This portion instructs the connection reply frame generator 19 to generate a connection reply frame of "connection OK/NG flag=NG".

Open Port Management DB Port 18

This is a database for managing a list of port numbers in a node which is capable of making transmissions/receptions. This database is generally included in an OS.

Connection Reply Frame Generator 19

This generates a connection reply frame from a connection request frame received. The fields to be changed in the connection request frame are as follows:

(1) Frame type: Changed to "connection reply";
(2) Connection OK/NG flag field: Depending on instructions by the open port confirming portion 17;
(3) Port number of NAPT device: Cleared;
(4) IP address of NAPT device: Cleared.

Address/Port No. Acquiring Portion 20 for Control Session

This acquires the IP address of the association server SRV, as well as the port numbers of the association server and its own node associated with the control session from a control/data session management DB portion 21. This also instructs the TCP/IP frame generator 13 to generate a TCP/IP frame (connection reply frame) in which the acquired IP address and port number of the association server are made a destination address and a destination port number, and the port number of its own node is made a source port number. It is also supposed in the same manner as above that the control session is preliminarily established with the association server by a certain method not described here.

Control/data Session Management DB Portion 21

This is a database for managing the IP address and the port number of the association server as well as the port number of its own node, for the control session and the data session.

NAPT Device IP Address/port No. Field Acquiring Portion 22

This acquires values of "IP address field of NAPT device" and "port No. field of NAPT device" from a connection reply frame provided from the open port confirming portion 17 or a connection reply frame provided from the connection OK/NG flag determining portion 16.

Communication Source Local Port No. Acquiring Portion 23

This acquires a value of "communication source LAN port No. field". This also instructs the TCP/IP frame generator 13 to generate a frame in which the port number is made the communication source port, and the IP address and the port number acquired at the NAPT device IP address/port No. field acquiring portion 22 are respectively made the destination address and the destination port number.

Communication Destination LAN Port No. Acquiring Portion 24

This acquires a value of "communication destination LAN port No. field", and instructs the TCP/IP frame generator 13 to generate a frame in which the port number is made the communication source port, and the IP address and the port number acquired at the NAPT device IP address/port No. field acquiring portion 22 are made the destination address and the destination port number.

Address/port No. Acquiring Portion 25 of Data Session

This acquires the IP address of the association server SRV and the port number of the association server associated with the data session, from the control/data session management DB portion 21. This instructs the TCP/IP frame generator 13 to generate a TCP/IP frame (connection reply frame) in which the acquired IP address and port number of the association server are made the destination address and the destination port number, and an arbitrary port number of its own node is made the source port number.

◎ Embodiment of Association Server

Figure 7:
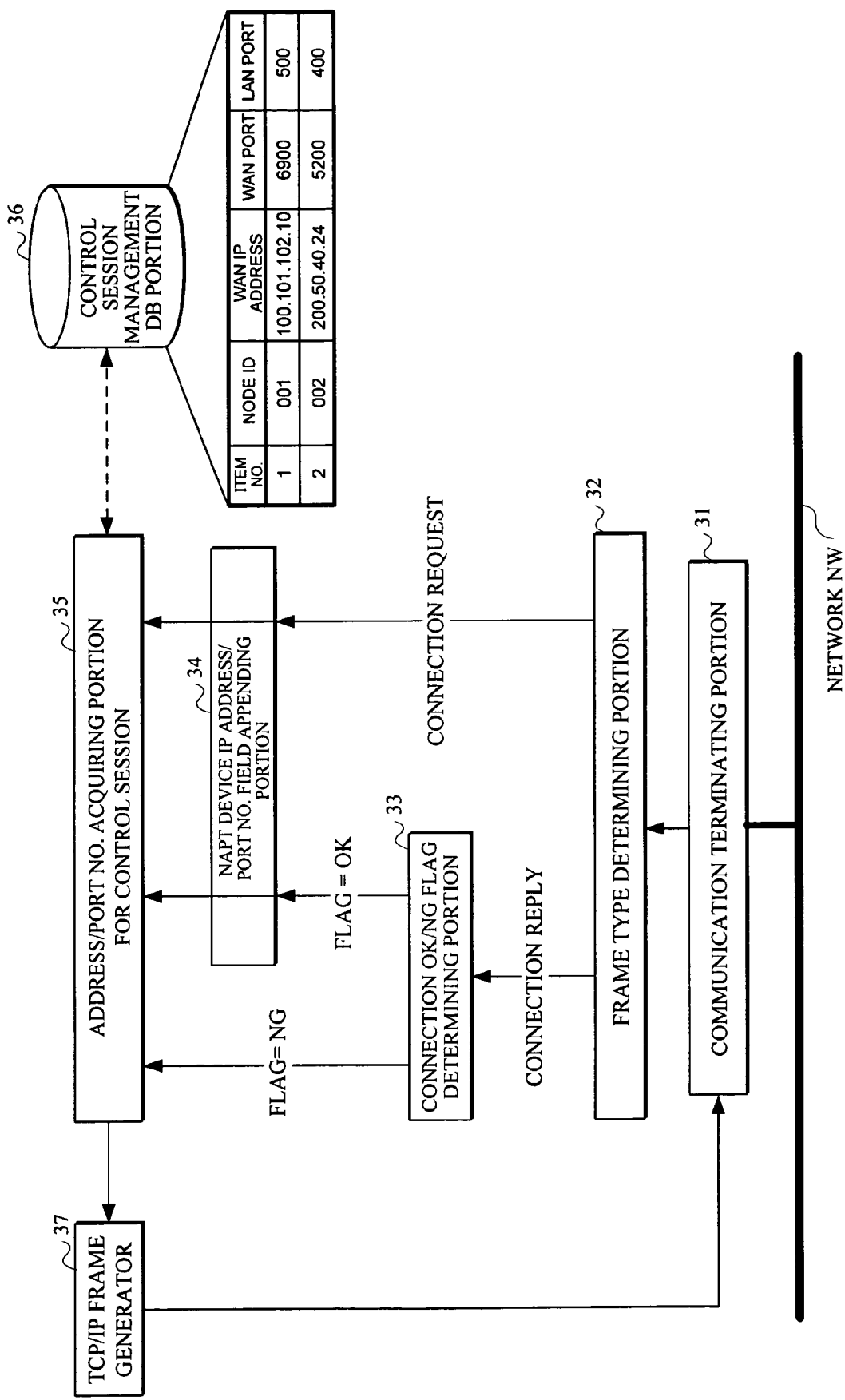
FIG. 7 is a block diagram showing an arrangement example of an association server shown in FIGS. 1 and 4.

FIG. 7 shows an arrangement embodiment of the association server SRV shown in FIGS. 1 and 4 in the form of block diagram. Hereinafter, the function of each block will be sequentially described.

Communication Terminal Portion 31

This has the same function as the communication terminal portion 14 shown in FIG. 6.

Frame Type Determining Portion 32

This identifies "frame type field" in a frame received from the communication terminal portion 31. Consequently, this portion transfers the frame to a connection OK/NG flag determining portion 33 in case of "connection reply", or to a NAPT device IP address/port No. field appending portion 34 in case of "connection request".

Connection OK/NG Flag Determining Portion 33

This identifies "connection OK/NG flag field" in the "connection reply" frame received from the frame type determining portion 32. This portion transfers the frame to the NAPT device IP address/port No. field appending portion 34 in case of "OK", or to an address/port No. acquiring portion 35 for the control session in case of "NG".

NAPT Device IP Address/port No. Field Appending Portion 34

This appends the source IP address and the source port number of the frame respectively to "IP address field of NAPT device" and "port No. field of NAPT device" of the connection request frame or connection reply frame. After the appending process, this portion transfers the frame to the address/port No. acquiring portion 35 for the control session.

Address/port No. Acquiring Portion 35 for Control Session

This acquires a destination IP address and a port number for the control session transferring the connection reply frame or connection request frame, and instructs a TCP/IP frame generator 37 to generate a frame.

(1) Upon transferring connection reply frame: The global IP address and the port number for the control session of a node having a node ID in the communication source node ID field are acquired;

(2) Upon transferring connection request frame: The global IP address and the port number for the control session of a node having a node ID in the communication destination node ID field are acquired.

Control Management DB Portion 36

This is a database holding information for control session established between a plurality of nodes and the association server.

TCP/IP Frame Generator 37

This has the same function as the TCP/IP frame generator shown in FIG. 6.

Operation Embodiment [1]

(1) Connection Request Transmission: Thick Line in FIG. 8; Steps S1_1, S1_2 in FIGS. 1 and 3

Figure 8:
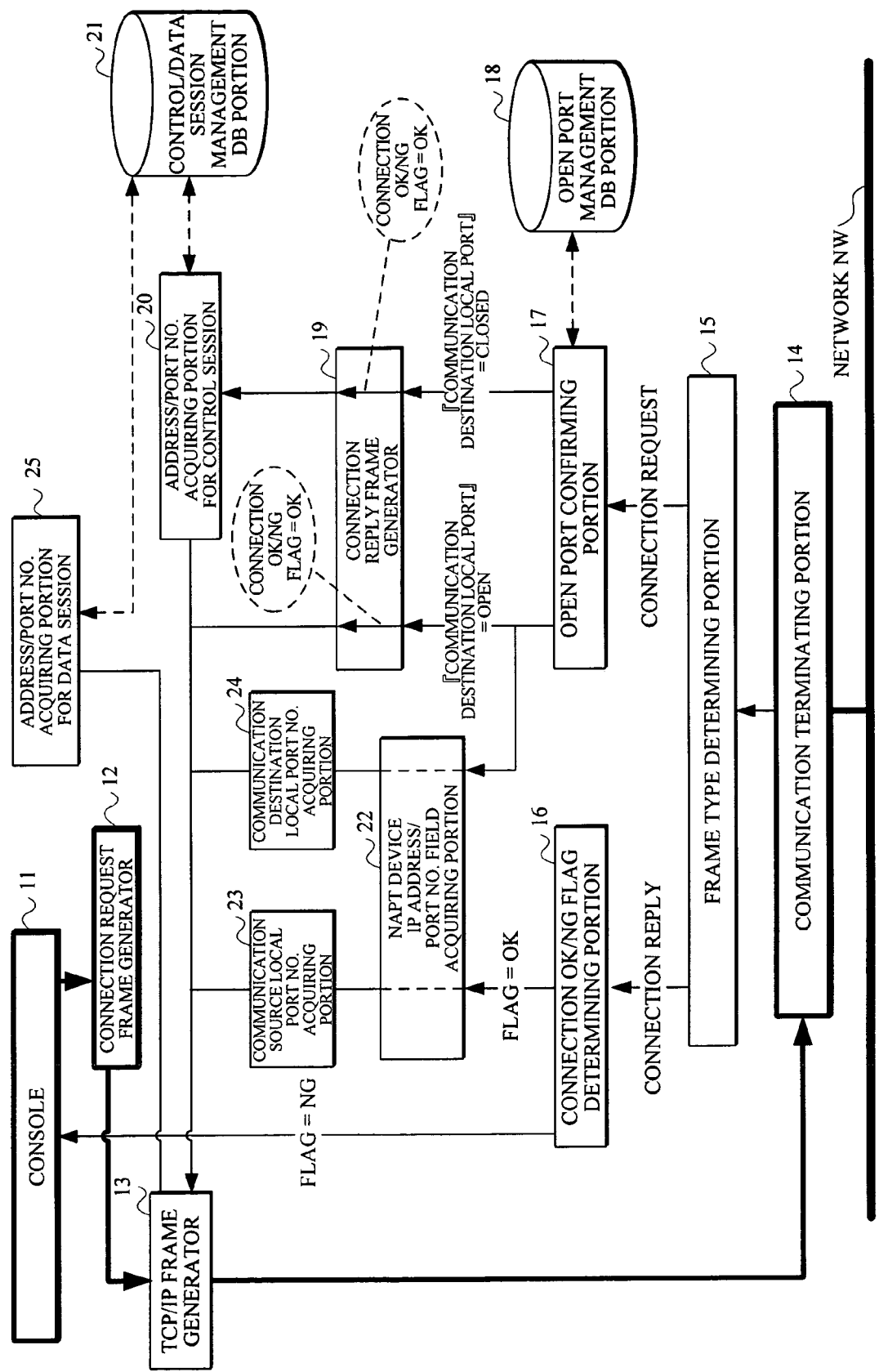
FIG. 8 is a block diagram for explaining an operation example (connection reply transmission) of a node N1 shown in FIGS. 1 and 4.

At first, a user instructs the connection reply generator 12 to generate a "connection request" frame (FIG. 3A) from the console 11, as shown by a thick line in FIG. 8. In response, the connection request frame generator 12 generates the connection request frame and send it to the TCP/IP frame generator 13, which then generates a TCP/IP frame and transmits it to the communication terminal portion 14, which then performs a processing for link layer to be transmitted to the network NW (private IP address network NW1).

This enables the connection request frame to be transmitted to the association server SRV for the node N1 through the data session DS1.

(2) Connection Request Transfer: Thick Line in FIG. 9; Steps S1_3, S1_4 in FIGS. 1 and 3

Figure 9:
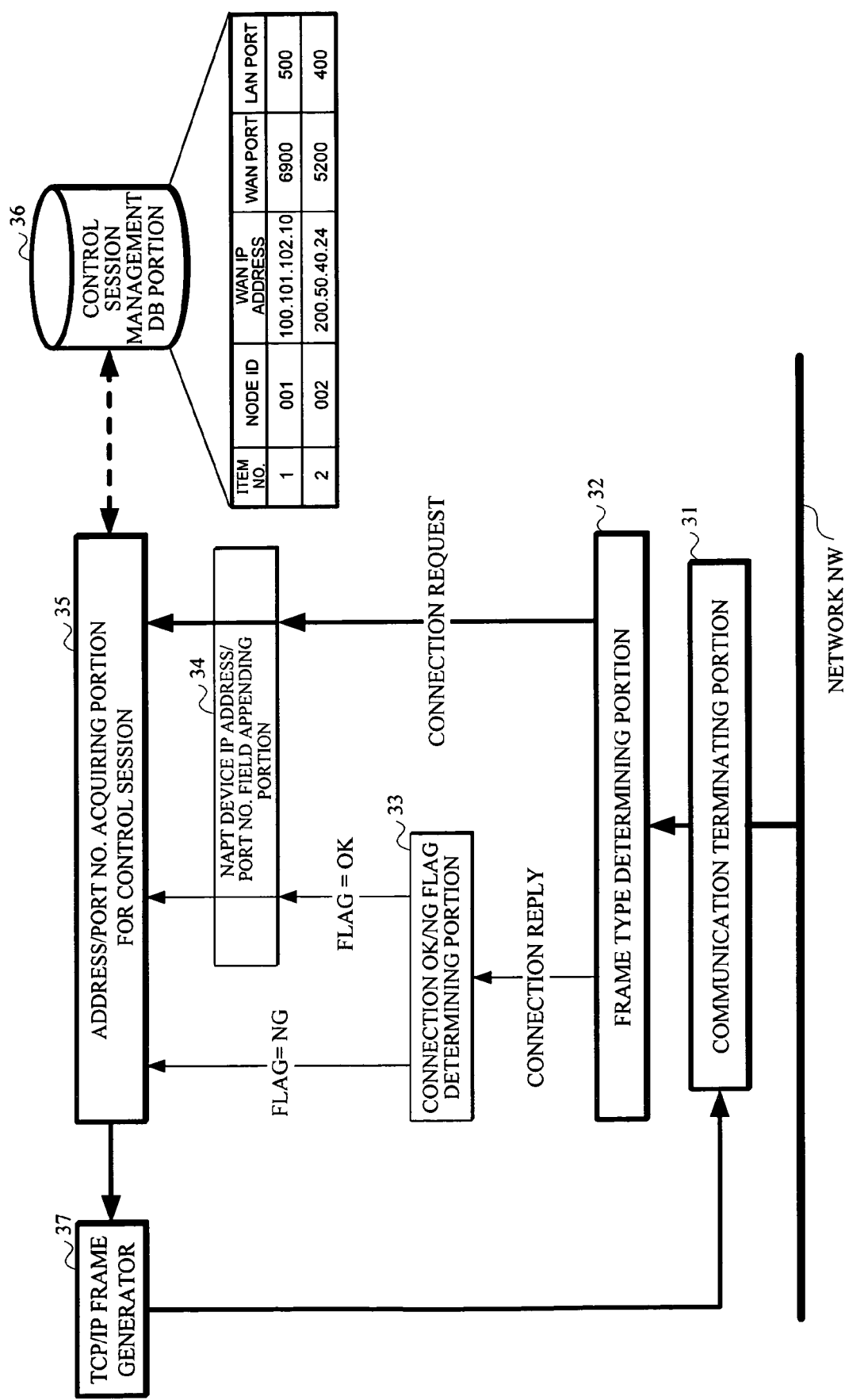
FIG. 9 is a block diagram for explaining an operation example (connection request transfer) of an association server shown in FIGS. 1 and 4.

In the association server SRV having received the connection request frame from the node N1, as shown by a thick line in FIG. 9, the communication terminal portion 31 transfers the connection request frame to the frame type determining portion 32. This frame type determining portion 32 identifies the frame type in a frame received from the communication terminal portion 31 according to the frame type field (FIG. 3A(b)), and consequently transfers the connection request frame to the NAPT device IP address/port No. field appending portion 34 in case of "connection request".

The NAPT device IP address/port No. field appending portion 34 appends the source IP address (FIG. 3A(a-1): IP address of NAPT device AC1 "100.101.102.10") and the source port number (FIG. 3A(a-2): port number of NAPT device AC1 "7800") in the connection request frame respectively to "IP address field of the NAPT device AC1 (FIG. 3A(d): IP address "100.101.102.10")" and "port No. field of the NAPT device AC1 (FIG. 3A(e): port number "7800")". After this appending (adding) process, the portion 34 transfers the connection request frame to the address/port No. acquiring portion 35 for the control session.

The address/port No. acquiring portion 35 for the control session acquires the destination IP address (FIG. 3A(a-3): IP address of the NAPT device AC2 "200.50.40.24") and the port number (FIG. 3A(a-4): port number of the NAPT device AC2 "5200") for the control session CS2 transferring the connection request frame, and instructs the TCP/IP frame generator 37 to generate a frame. The TCP/IP frame generator 37 generates a TCP/IP frame from the connection request frame received from the address/port No. acquiring portion 35 for the control session to be transmitted to the network NW (global IP address network NW2) through the communication terminal portion 31.

(3) Connection Request Reception: Thick Line in FIG. 10; Steps S2, S3, S4_1, S4_2 in FIG. 1

Figure 10:
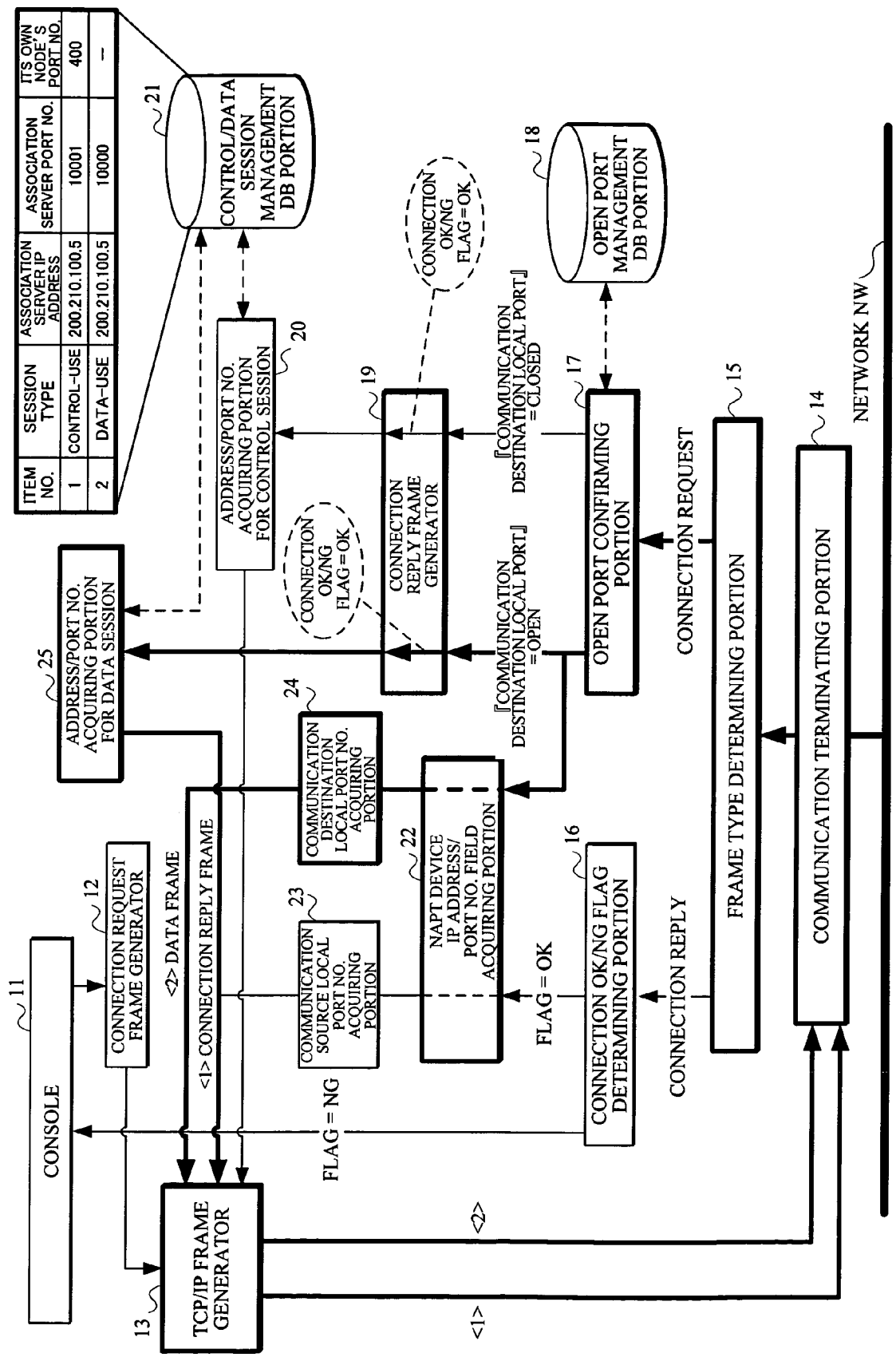
FIG. 10 is a block diagram for explaining an operation example of a node N2 (connection request reception, connection reply transmission, and data frame transmission) used in FIGS. 1 and 4.

In the node N2 having received the connection request frame transmitted from the association server SRV through the NAPT device AC2, as shown by a thick line in FIG. 10, the communication terminal portion 14 receives the connection request frame from the network NW (private IP address network NW3), and the frame type determining portion 15 determines whether the frame received is a "connection request" frame or a "connection reply" frame. As a result, it is found that the frame received is a connection request frame, so that the open port confirming potion 17 acquires "communication destination LAN port No. field" (FIG. 3A(i): port number of the node N1 "300") from the connection request frame, and inquires whether or not this port number "300" is opened to the public of the open port management DB portion 18.

When it is consequently found from the open port management DB portion 18 that the port number "300" is opened to the public, the open port confirming portion 17 instructs the connection reply frame generator 19 to generate a connection reply frame (FIG. 3B) where "connection OK/NG flag=OK".

The connection reply frame generator 19 generates from the received connection request frame a connection reply frame in which the frame type is changed to "connection reply" (FIG. 3B(b)) and the connection OK/NG flag is set "OK" (FIG. 3B(c)), and sends it to the address/port No. acquiring portion 25 for the data session.

The address/port No. acquiring portion 25 for the data session acquires the global IP address "200.210.100.5" of the association server SRV and the port number "10000" of the association server SRV for the data session DS2 from the control/data session management DB portion 21. The portion 25 instructs the TCP/IP frame generator 13 to generate a TCP/IP frame (connection reply) in which the acquired IP address and port number for the control session of the association server SRV are made a destination address and port number (FIG. 3B(a-3): (a-4)). It is to be noted that the data session DS2 is not preliminarily established with the association server SRV. It is also supposed that the node N2 preliminarily knows the data session port number "10000" of the association server SRV by a known method not described here.

The connection reply frame in which "connection OK/NG flag=0" is set is transmitted to the TCP/IP frame generator 13 (FIG. 10<1>), which generates a TCP/IP frame to be transmitted to the network NW (private IP address network NW3) from the communication terminal portion 14.

Figure 11:
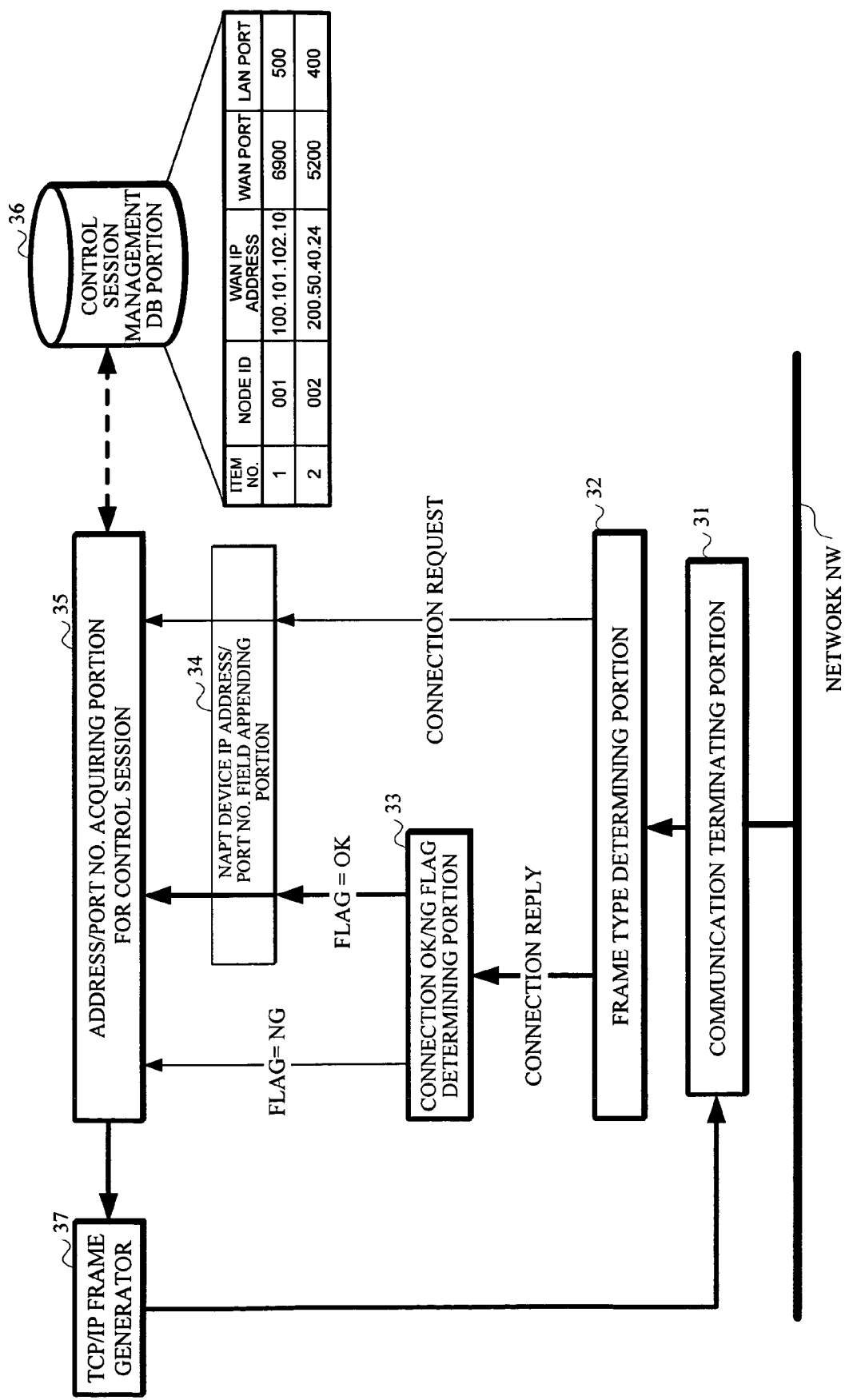
FIG. 11 is a block diagram for explaining an operation example (connection reply transfer) of an association server shown in FIGS. 1 and 4.

(4) Connection Reply Transfer: Thick Line in FIG. 11; Steps S4_3, S4_4 in FIGS. 1 and 3

In the association server SRV having received at the communication terminal portion 31 the communication reply frame from the node N2 through the network NW (global IP address network NW2), the frame type determining portion 32 now determines that the received frame is a "connection reply" frame, so that when the determination result is transmitted to the connection OK/NG flag determining portion 33, the connection reply frame is forwarded to the NAPT device IP address/port No. field appending portion 34 since it is found by the portion 33 that "connection OK/NG flag field" (FIG. 3B(c)) is set "OK".

In the NAPT device IP address/port No. field appending portion 34, "200.50.40.24" and "4100" are respectively appended to "IP address field of the NAPT device AC2" (FIG. 3B(d)) and "port No. field of the NAPT device AC2" (FIG. 3B(e)). This frame appended is transferred to the address/port No. acquiring portion 35 for the control session.

The address/port No. acquiring portion 35 for the control session acquires, in the same manner as the connection request transfer operation shown in FIG. 9, the destination IP address (FIG. 3B(a-3): IP address of the NAPT device AC1 "100.101.102.10") and the port number (FIG. 3B(a-4): port number "6900" of the NAPT device AC1) for the control session CS1 transferring the connection reply frame from the control session management DB portion 36, instructs the TCP/IP frame generator 37 to generate a frame, and transmits it to the network NW (global IP address network NW2) from the communication terminal portion 31.

(5) Connection Reply Reception: Thick Line in FIG. 12

Figure 12:
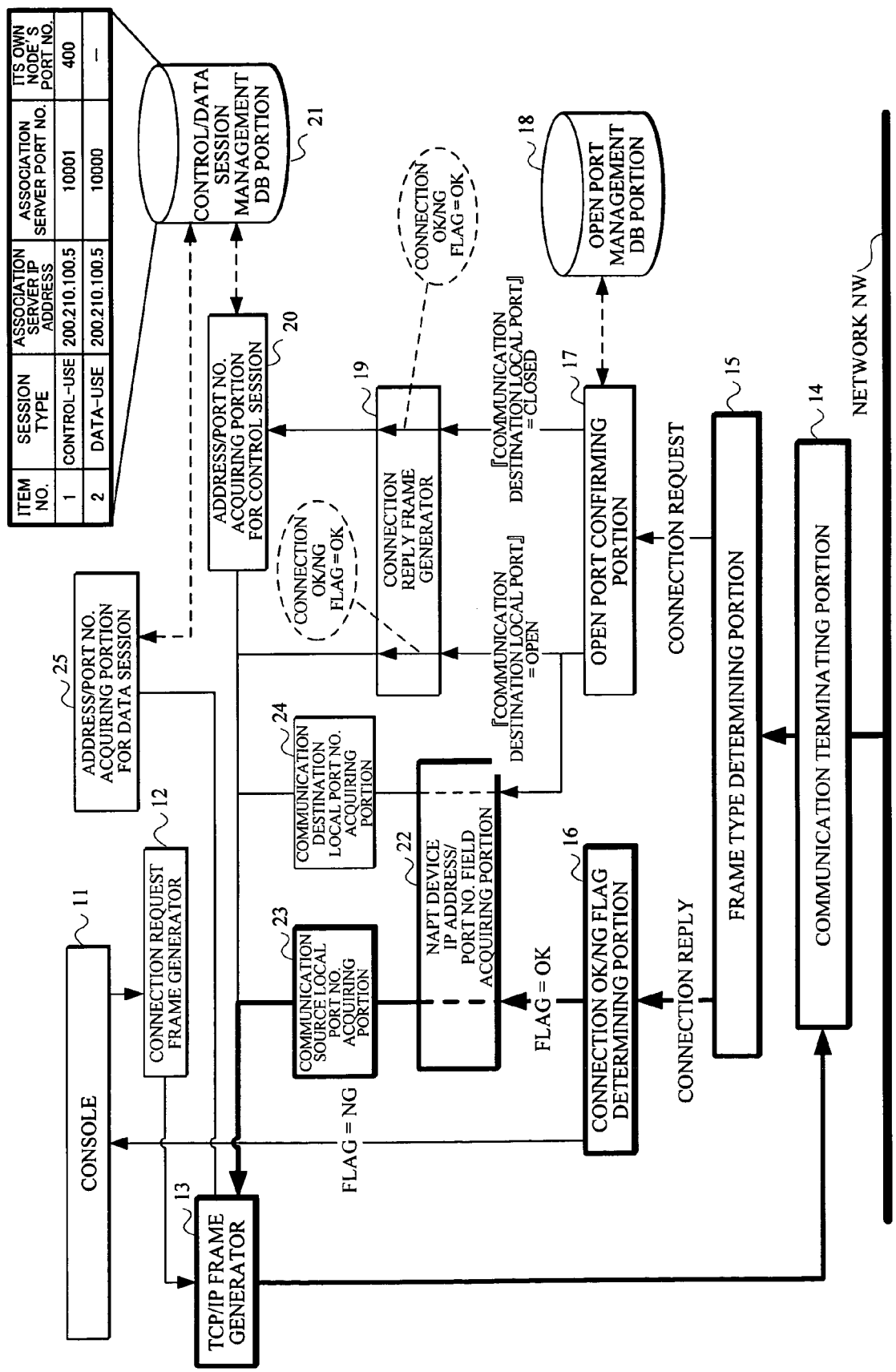
FIG. 12 is a block diagram for explaining an operation example of a node N1 (connection reply reception and data frame transmission) used in FIGS. 1 and 4.

In the node N1 having received the connection reply frame received from the association server SRV, as shown by a thick line in FIG. 12, the communication terminal portion 14 receives the frame from the network NW (private IP address network NW1). Then, the frame type determining portion 15 determines the type of the frame, and consequently forwards the received frame to the connection OK/NG flag determining portion 16 since the received frame is found to be a "connection reply" frame.

Since determining that the connection OK/NG flag (FIG. 3B(c)) is set "OK", the connection OK/NG flag determining portion 16 provides the flag to the NAPT device IP address/port No. field acquiring portion 22, which acquires "IP address field of NAPT device" (FIG. 3B(d): global IP address "200.50.40.24" of the NAPT device AC2) and "port No. field of the NAPT device" (FIG. 3B(e): port number "4100" of the NAPT device AC2) from the received connection reply frame.

Then, the communication source local port No. acquiring portion 23 acquires "communication destination LAN port No. field" (FIG. 3B(g): port number "300") from the connection reply frame. This portion 23 instructs the TCP/IP frame generator 13 to generate a UDP data frame in which the acquired port number "300" is made the source port number, and the IP address and port number of the NAPT device AC2 acquired by the NAPT device IP address/port No. field acquiring portion 22 are made the destination IP address and port number.

(6) Transmission of Data Frame: FIGS. 12 and 10; Steps S5, S6 in FIG. 1

Based on the above (5), the TCP/IP frame generator 13 transmits the UDP data frame generated to the network NW (private IP address network NW1) as data frame from the communication terminal portion 14 (at step S5).

Also in FIG. 10, the node N2 transmits a UDP data frame in the same manner as the case where the node N1 transmits the data frame. In the node N2, after having confirmed that "communication destination local port"=open, the open port confirming portion 17 transfers the connection request frame to the NAPT device IP address/port No. field acquiring portion 22.

The NAPT device IP address/port No. field acquiring portion 22 acquires values of "IP address field of NAPT device" and "port No. field of NAPT device" from the connection request frame received from the open port confirming portion 17, and forwards them to the communication destination local port No. acquiring portion 24. This communication destination local port No. acquiring portion 24 acquires a value "600" of "communication destination local port No. field" (FIG. 3B(i)), and instructs the TCP/IP frame generator 13 to generate a UDP data frame (FIG. 10<2>)) in which that port number is made the source port number, and the IP address and port number acquired by the NAPT device IP address/port No. field acquiring portion 22 are made the destination IP address and the port number, respectively. The TCP/IP frame generator 13 generates such a UDP data frame to be transmitted to the network NW (private IP address network NW3) through the communication terminal portion 14.

Thus, the NAPT devices AC1 and AC2 can bind the nodes arranged at the end of its own network with a NAPT device arranged at the end of the opposed network by using an IP address and port number. Therefore, as shown in FIG. 1, the nodes N1 and N2 can directly and mutually communicate with each other through the NAPT devices AC1 and AC2, not through the association server SRV (at step S7).

Operation Embodiment [2]

In this operation embodiment, the operations (1) and (2) in the above operation embodiment [1] are similarly applied to this embodiment.

Figure 13:
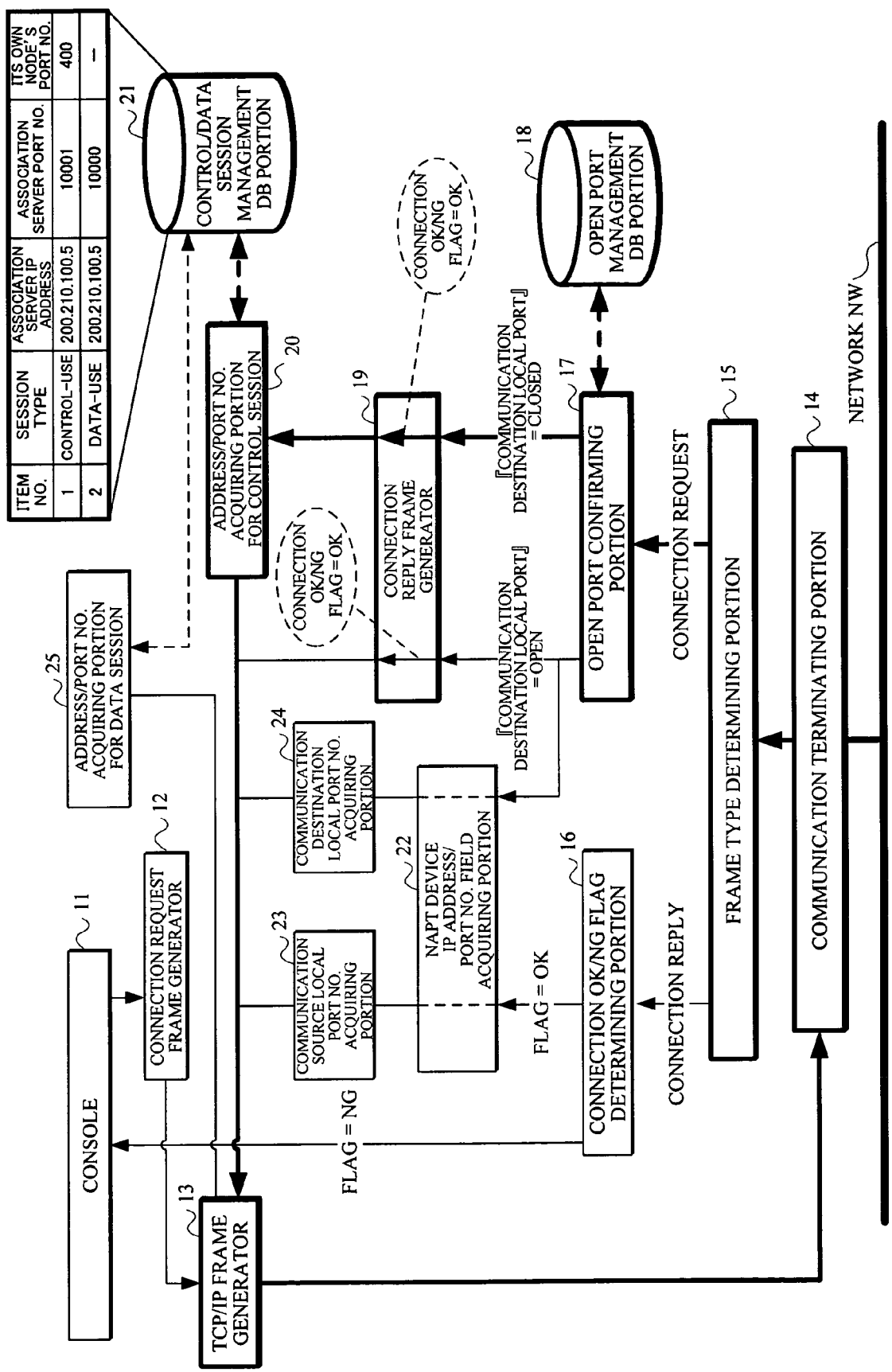
FIG. 13 is a block diagram for explaining an operation example of a node N2 (connection request reception and connection reply transmission) used in FIGS. 1 and 4.

(3) Connection Reply Transmission: Thick Line in FIG. 13; Steps S8, S9_1, S9_2 in FIG. 4

The connection request frame received from the association server SRV is transferred to the communication terminal portion 14, the frame type determining portion 15, and the open port confirming portion 17 in the node N2 like the above operation embodiment [1], in which when the open port confirming portion 17 has found that "communication destination local port" is closed by referring to the open port management DB portion 18, the connection reply frame generator 19 responsibly sets the connection OK/NG flag (FIG. 5(c)) to "NG" and the frame type (FIG. 5(b)) to "connection reply" to be forwarded to the address/port No. acquiring portion 20 for the control session.

The address/port No. acquiring portion 20 for the control session acquires the global IP address "200.210.100.5" of the association server SRV as well as the port number "5200" of the association server SRV and the port number "400" of its own node for the control session CS2 from the control/data session management DB portion 21. The portion 20 then instructs the TCP/IP frame generator 13 to generate a TCP/IP frame (connection reply) in which the acquired IP address and port number for the control session of the association server SRV are made the destination address and port number (FIG. 5(a-3): (a-4)), and the port number of its own node is made the source port number (FIG. 5(a-2)). The TCP/IP frame generator 13 transmits the corresponding connection reply frame to the network NW (private IP address network NW3) from the communication terminal portion 14.

Figure 14:
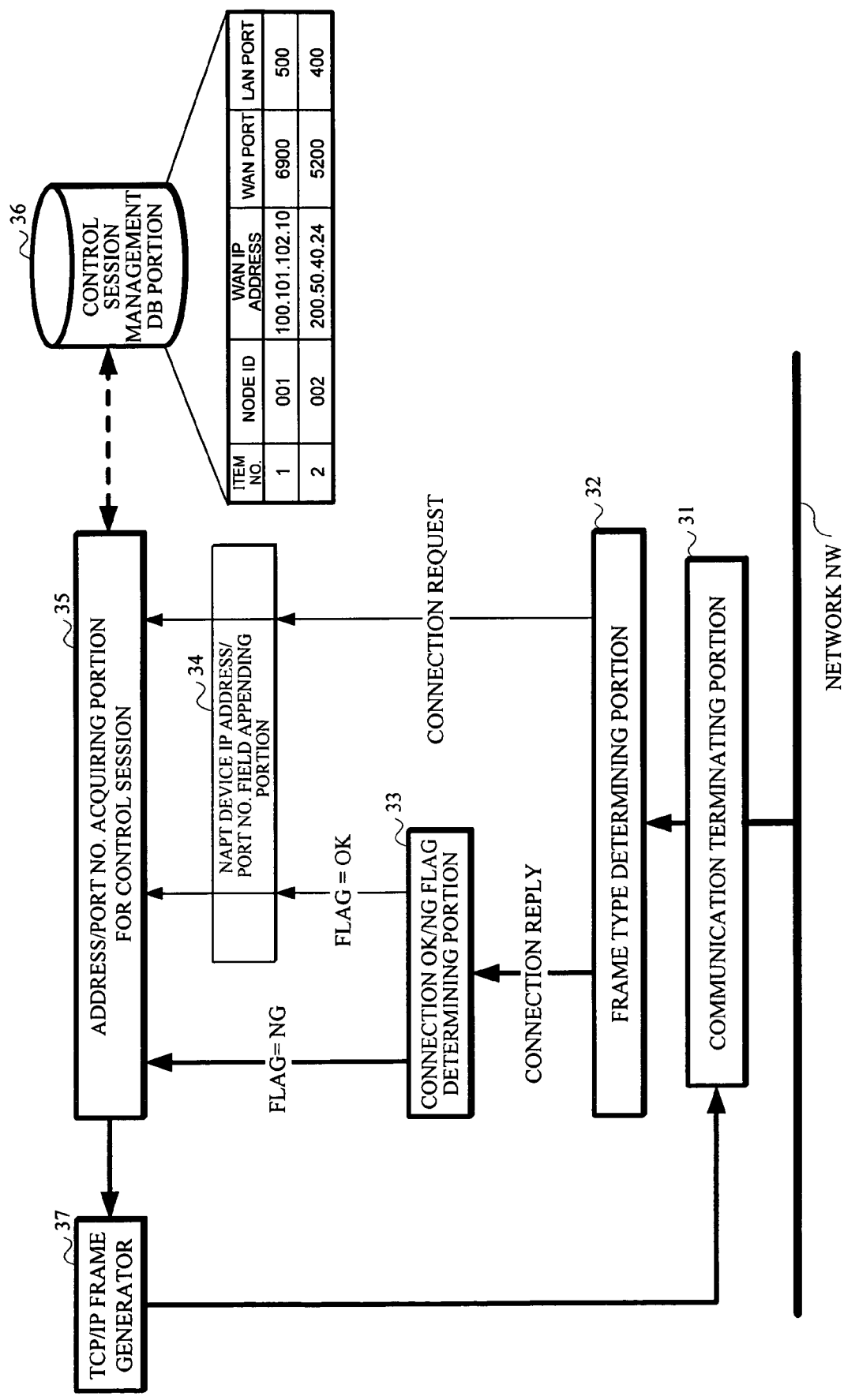
FIG. 14 is a block diagram for explaining an operation example (connection reply transfer) of an association server shown in FIGS. 1 and 4.

(4) Connection Reply Transfer: Thick Line in FIG. 14; Steps S9_3, S9_4 in FIGS. 4 and 5

The association server SRV receives the connection reply frame through the communication terminal portion 14, the frame type determining portion 15, and the connection OK/NG flag determining portion 33. At this time, since having found that the connection OK/NG flag (FIG. 5(c)) is set "NG", the determining portion 33 notifies it to the address/port number acquiring portion 35 for the control session. The address/port number acquiring portion 35 for the control session instructs the TCP/IP frame generator 37 to provide a TCP/IP frame in which the destination port number (in FIG. 5(a-4)) is changed from "10001" to "6900", the destination IP address (FIG. 5(a-3)) is changed from the IP address "200.210.100.5" of the association server SRV to the IP address "100.101.102.10" of the NAPT device AC1, and the source port number (FIG. 5(a-2)) is changed from the port number "5200" of the NAPT device AC2 to the port number "10001" of the NAPT device AC1.

Figure 15:
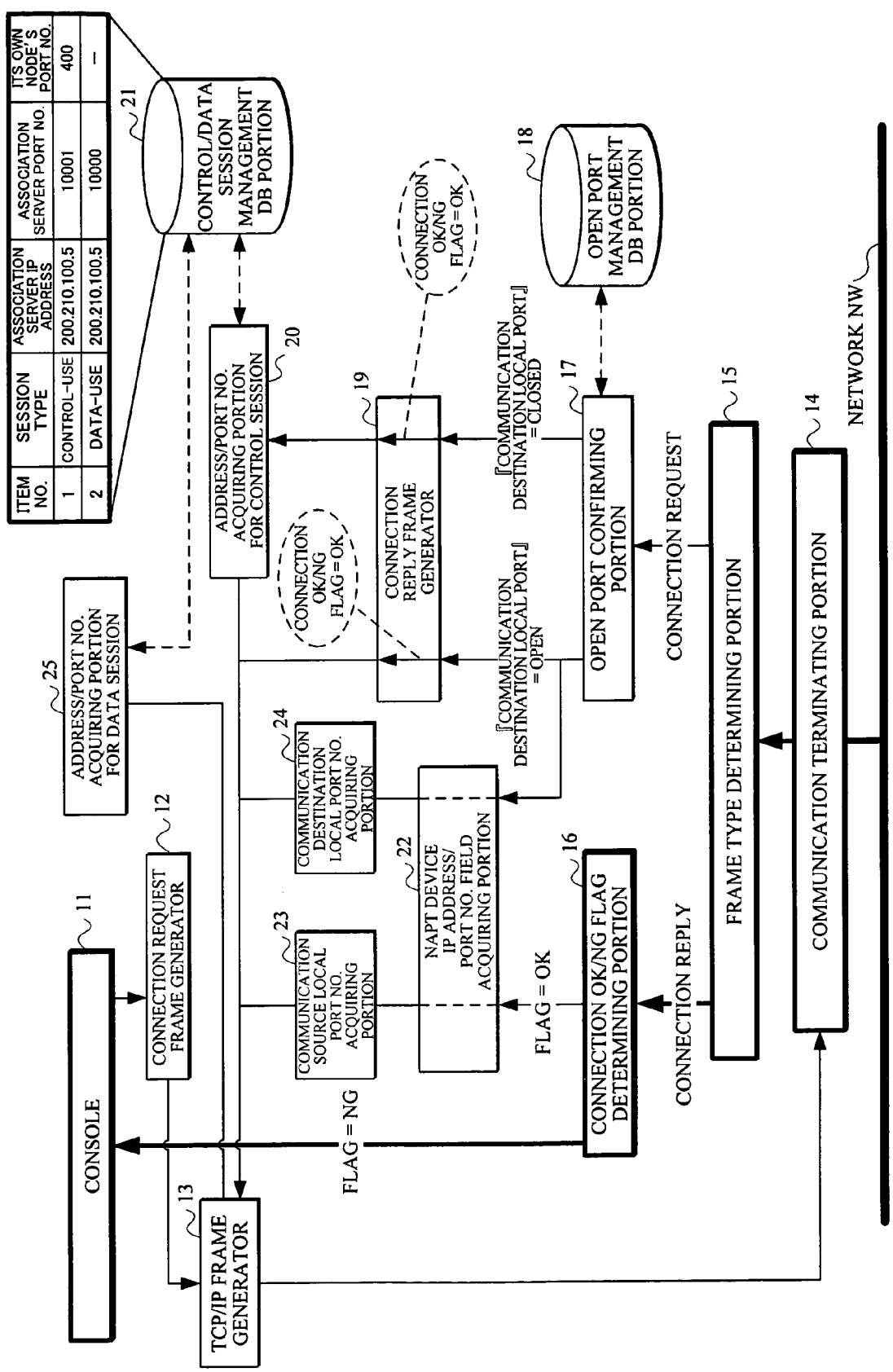
FIG. 15 is a block diagram for explaining an operation example of a node N1 (connection reply reception) shown in FIGS. 1 and 4.
Figure 16:
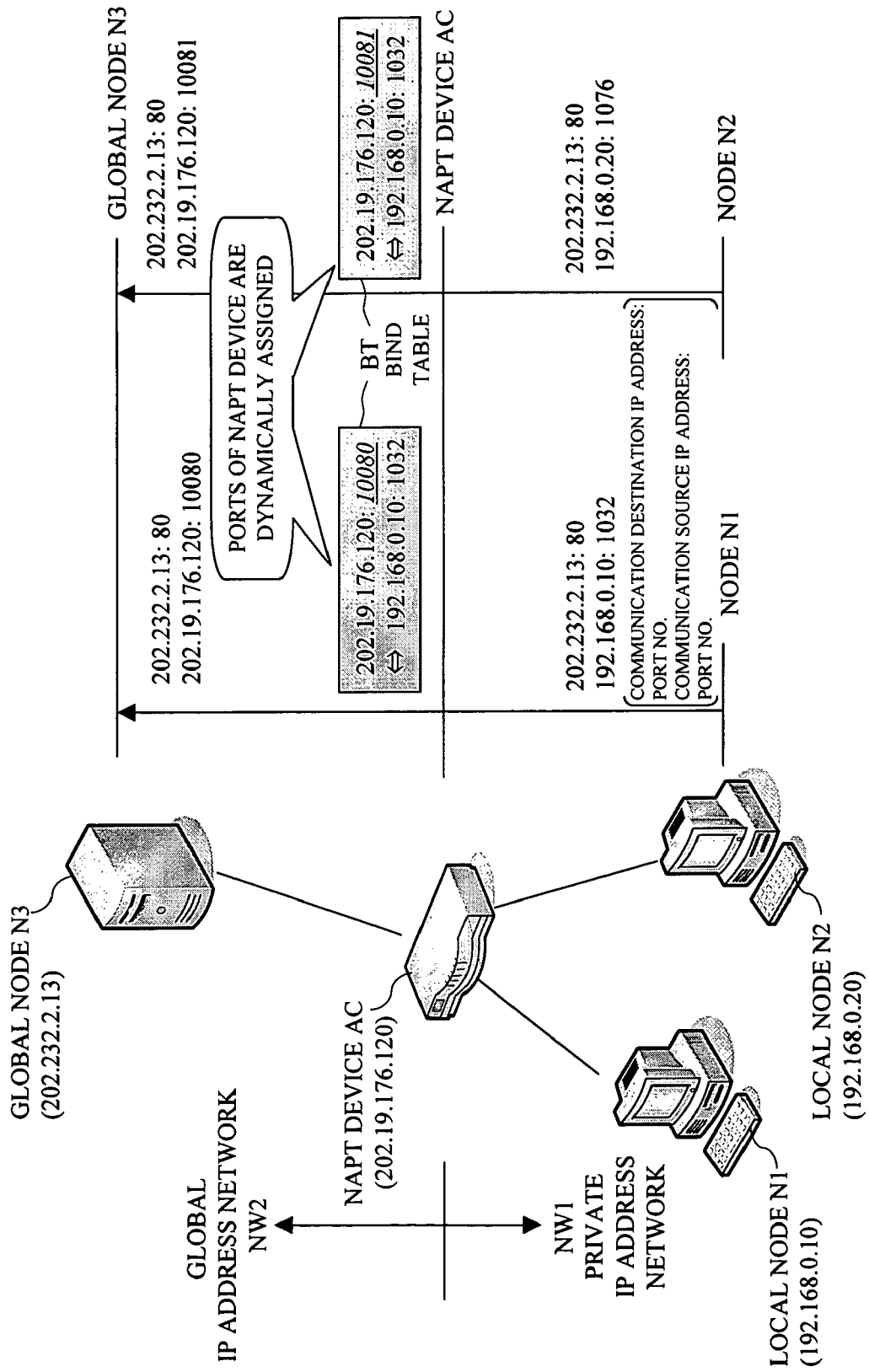
FIG. 16 is a diagram for explaining an operation of a general NAPT device.
Figure 17:
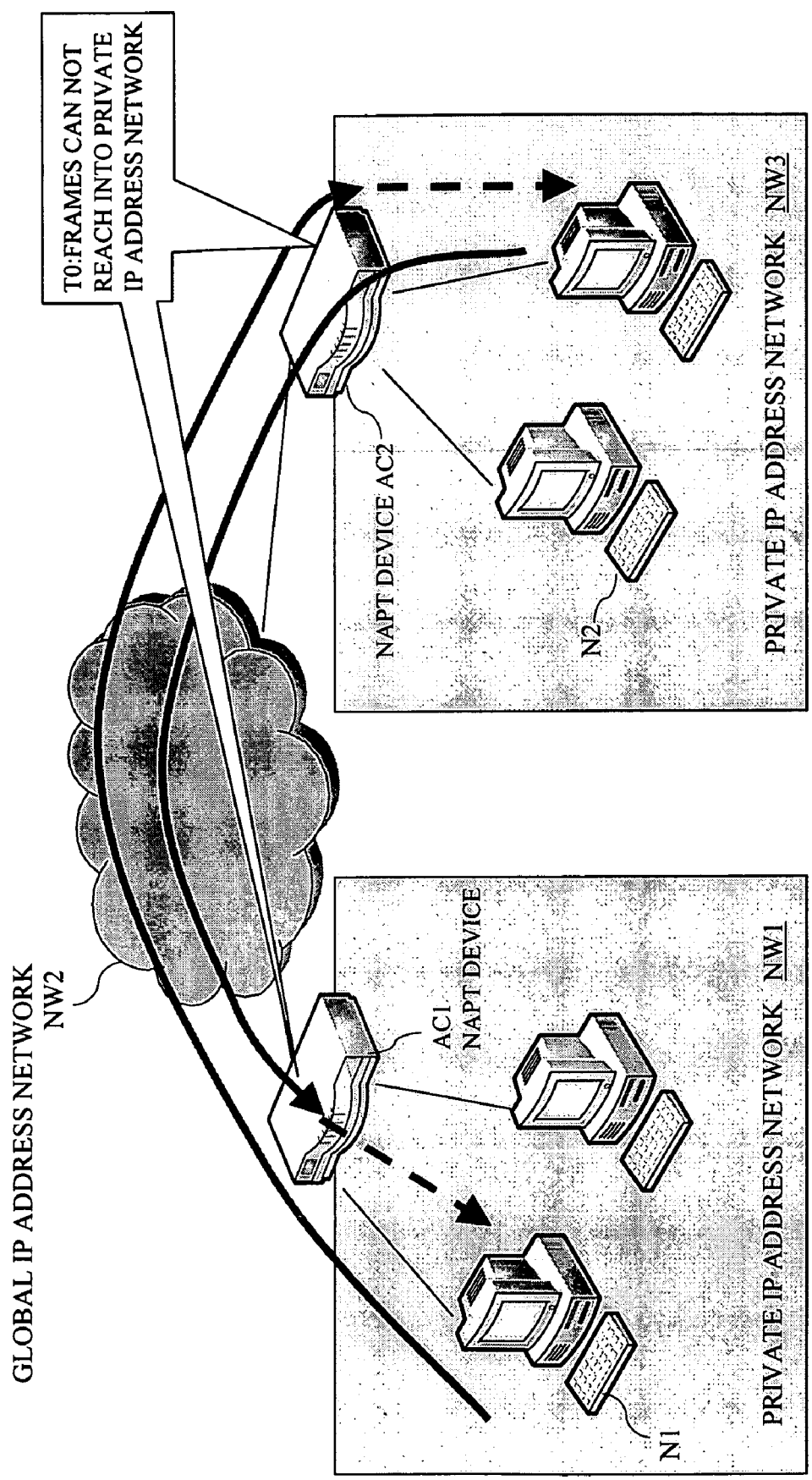
FIG. 17 is a diagram for explaining a problem of a NAPT device shown in FIG. 16.
Figure 18:
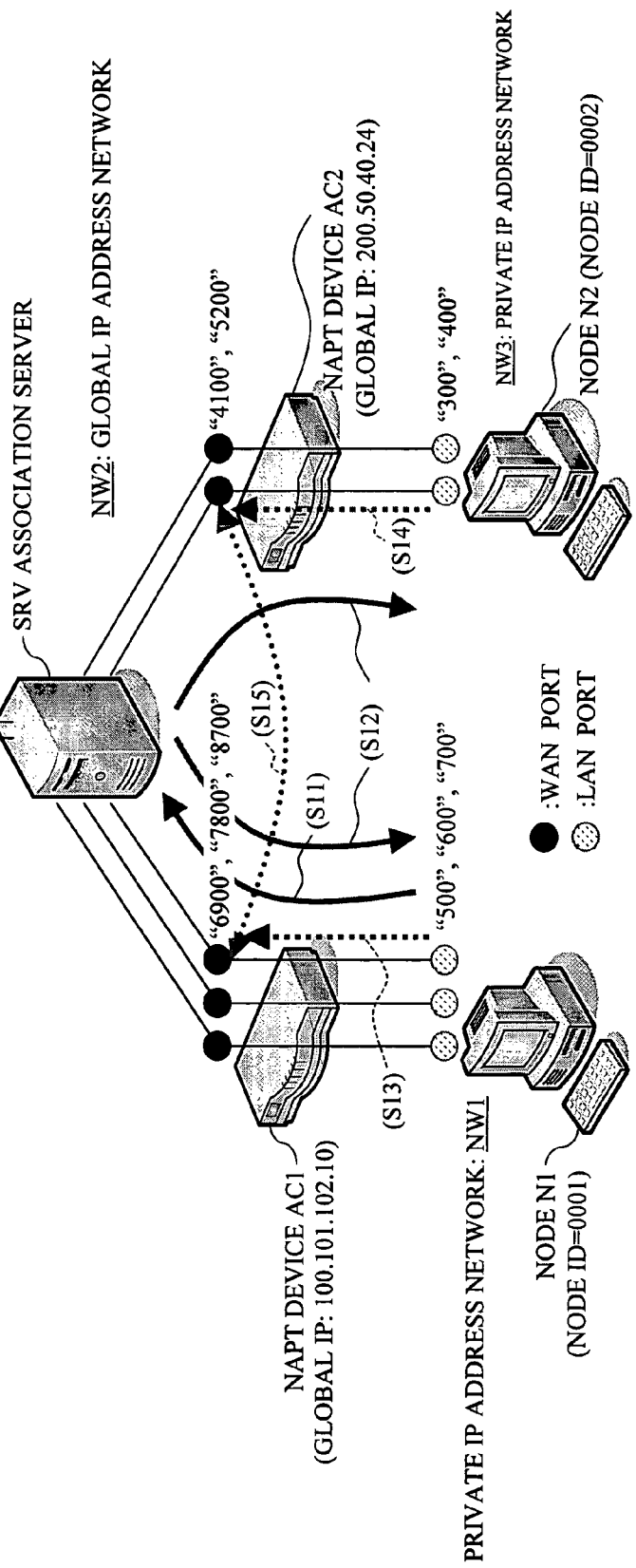
FIG. 18 is a block diagram for explaining an operation of STUN known in the prior art.

(5) Connecting Reply Reception: Thick Line in FIG. 15

In the node N1 having received the connection reply frame from the association server SRV through the NAPT device AC1, as shown in FIG. 1, it is found that the OK/NG flag (FIG. 5(c)) in the connection reply frame is set "NG" by way of the communication terminal portion 14, the frame type determining portion 15, and the connection OK/NG flag determining portion 16, so that the flag is notified to the user through the console 11.

Thus, the user can recognize that such a connection request has been rejected by the communication destination node N2, so that the transmission/reception of data frame is not to be performed.

What is claimed is:

1. An inter-node connection method for at least a first and second nodes respectively connected to private IP address network ends of at least a first and second address translation devices, which translate a private IP address into a global IP address, through global IP address network ends of the first and second address translation devices, comprising:
   a first step of establishing a control session with the first or the second node respectively through the first or the second address translation device; and
   a second step of transferring a connection request frame or a connection reply frame respectively to the second or the first node by the control session through the second or the first address translation device when the connection request frame or the connection reply frame is received respectively from the first and second nodes by a data session, and
   further comprising a step of transmitting a data frame toward the first or the second address translation device based on an IP address and a port number of the first or the second address translation device respectively included in the connection request frame or the connection reply frame after the second or the first node has respectively received the connection request frame or the connection reply frame; and a step of enabling the first or the second address translation device to bind an IP address and a port number of the first or the second node included in the data frame respectively to the IP address and the port number of the second or the first address translation device for a direct communication between the nodes.

2. The inter-node connection method as claimed in claim 1, further comprising a step wherein when having received the connection request frame and recognized that a port of the second node associated with the connection request frame is unavailable, the second node transmits the connection reply frame of the recognition to the first node from a port of the control session.

3. The inter-node connection method as claimed in claim 1, wherein the control session is established based on an identification number of each node, a global IP address and a port number of each address translation device, and a port number of each node.

4. The inter-node connection method as claimed in claim 1, wherein the address translation device comprises a NAPT device.

5. An inter-node connection apparatus for at least a first and second nodes respectively connected to private IP address network ends of at least a first and second address translation devices, which translate a private IP address into a global IP address, through global IP address network ends of the first and second address translation devices, comprising:
   a first means establishing a control session with the first or the second node respectively through the first or the second address translation device; and
   a second means transferring a connection request frame or a connection reply frame respectively to the second or the first node by the control session through the second or the first address translation device when the connection request frame or the connection reply frame is received respectively from the first and second nodes by a data session, and
   further comprising a means of transmitting a data frame toward the first or the second address translation device based on an IP address and a port number of the first or the second address translation device respectively included in the connection request frame or the connection reply frame after the second or the first node has respectively received the connection request frame or the connection reply frame; and a means of enabling the first or the second address translation device to bind an IP address and a port number of the first or the second node included in the data frame respectively to the IP address and the port number of the second or the first address translation device for a direct communication between the nodes.

6. The inter-node connection apparatus as claimed in claim 5, further comprising a means wherein when having received the connection request frame and recognized that a port of the second node associated with the connection request frame is unavailable, the second node transmits the connection reply frame of the recognition to the first node from a port of the control session.

7. The inter-node connection apparatus as claimed in claim 5, wherein the control session is established based on an identification number of each node, a global IP address and a port number of each address translation device, and a port number of each node.

8. The inter-node connection apparatus as claimed in claim 5, wherein the address translation device comprises a NAPT device.

* * * * *